United States Patent [19]

Ulbing

[11] Patent Number: 4,557,153
[45] Date of Patent: Dec. 10, 1985

[54] HARMONIC SCREW ACTUATOR

[75] Inventor: Otmar M. Ulbing, Fairport, N.Y.

[73] Assignee: Air Monitor Corporation, Santa Rosa, Calif.

[21] Appl. No.: 503,742

[22] Filed: Jun. 13, 1983

[51] Int. Cl.⁴ .................. G05G 17/00; F16H 37/00; H02K 7/06
[52] U.S. Cl. .................. 74/2; 74/424.8 R; 74/625; 74/640; 310/80; 310/83
[58] Field of Search ............ 74/2, 424.8 R, 625, 74/640; 310/80, 83; 251/69, 133

[56] References Cited

U.S. PATENT DOCUMENTS

| | | | |
|---|---|---|---|
| 2,276,195 | 3/1942 | Holmes | 310/83 |
| 2,882,428 | 4/1959 | Frisch | 310/83 |
| 2,893,276 | 7/1959 | Quackenbush | 74/424.8 R |
| 2,906,143 | 3/1955 | Musser | 74/640 |
| 2,918,827 | 12/1959 | Brown | 74/424.8 |
| 2,943,508 | 7/1960 | Musser | 74/424.8 |
| 2,979,964 | 4/1961 | Musser | 74/424.8 |
| 3,065,645 | 11/1962 | Musser | 74/640 X |
| 3,077,792 | 2/1963 | Kinderman | 74/640 |
| 3,117,763 | 1/1964 | Musser | 251/165 |
| 3,147,631 | 9/1964 | Larsh | 74/424.8 R |
| 3,159,758 | 12/1964 | Hemperly, Jr. et al. | 310/83 |
| 3,356,874 | 12/1967 | Chiapparelli et al. | 74/424.8 R |
| 3,374,372 | 3/1968 | Tinder et al. | 310/80 |
| 3,495,108 | 2/1970 | Buskirk | 310/83 X |
| 3,512,421 | 5/1970 | Anderson | 74/625 X |
| 3,548,227 | 12/1970 | Woodward | 310/83 |
| 3,730,016 | 5/1973 | Miller | 74/424.8 |
| 4,041,795 | 8/1977 | Rekoff, Jr. | 74/424.8 |
| 4,084,744 | 4/1978 | Wilson | 236/49 |
| 4,183,371 | 1/1980 | Slawson | 74/2 X |
| 4,373,426 | 2/1983 | Weyer | 91/396 |
| 4,482,828 | 11/1984 | Vergues et al. | 74/424.8 R |

FOREIGN PATENT DOCUMENTS 855785 11/1952 Fed. Rep. of Germany... 74/424.8 R

Primary Examiner—William L. Freeh
Assistant Examiner—Paul F. Neils
Attorney, Agent, or Firm—Bean, Kauffman & Bean

[57] ABSTRACT

There is disclosed an improved "harmonic screw" type actuator wherein rotary motion of the power input component is converted into linear motion of the output component by means of a strain wave imposed upon a flexible sleeve member of the assembly, which is flexed into intermittent screw engagement by a member which is motor-driven to rotate relative to the periphery of the flexible sleeve; thereby causing progressively advancing/retreating inter-engagements of thread-like surfaces formed on the axially stationary and axially movable components of the system. A variety of automatic "fail-safe" provisions are included as well as means for manual operation in power loss situations.

22 Claims, 10 Drawing Figures

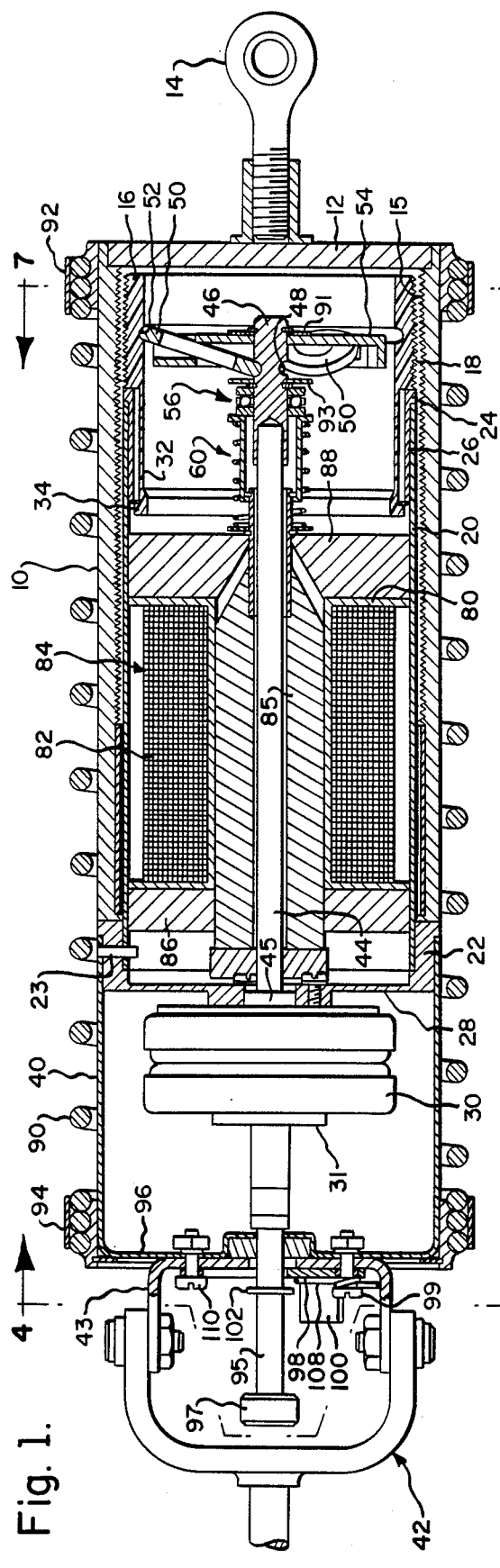
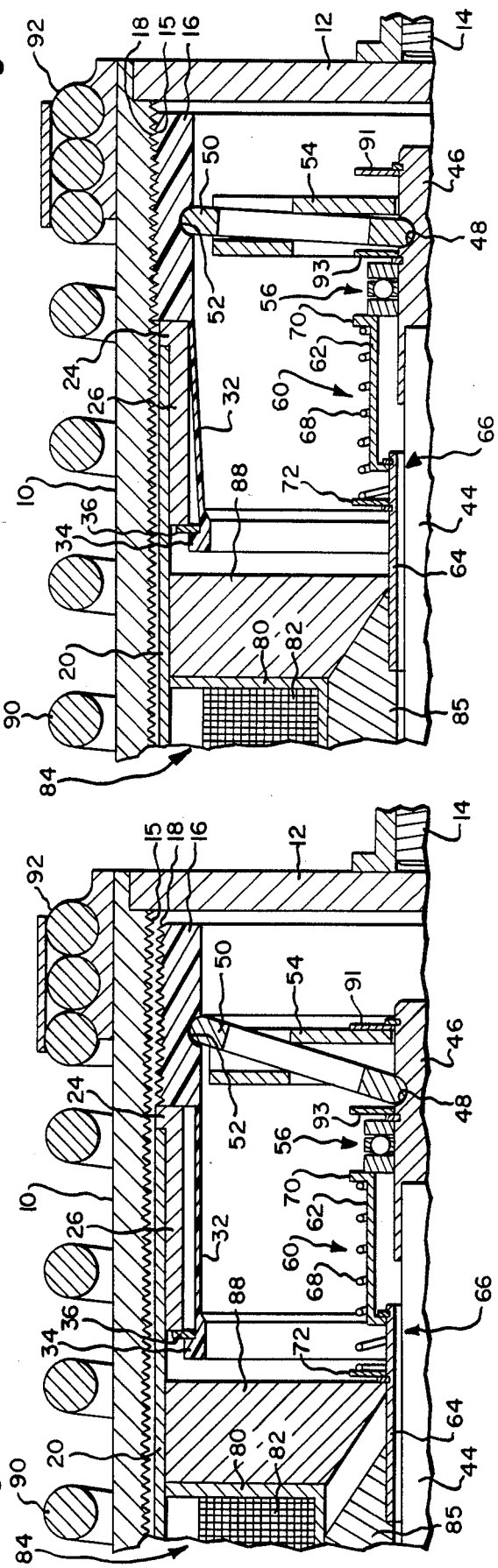
Fig. 1. Fig. 2. Fig. 3.

Fig. 4.
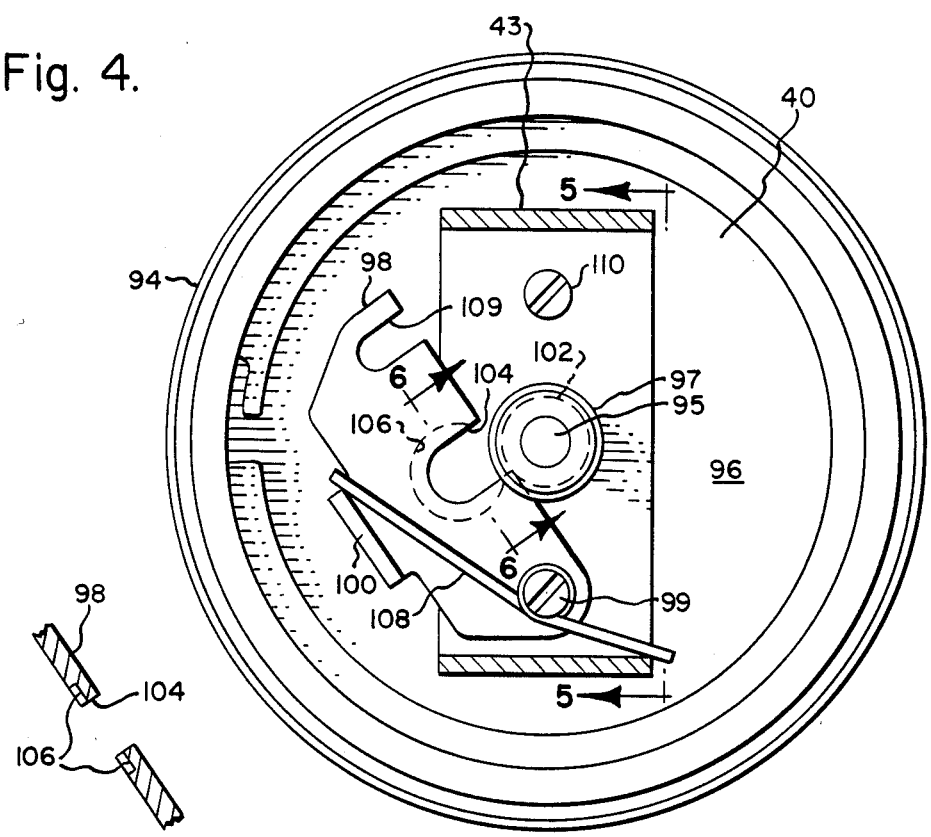
Fig. 5.
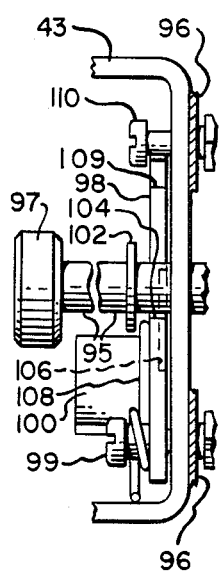
Fig. 6.
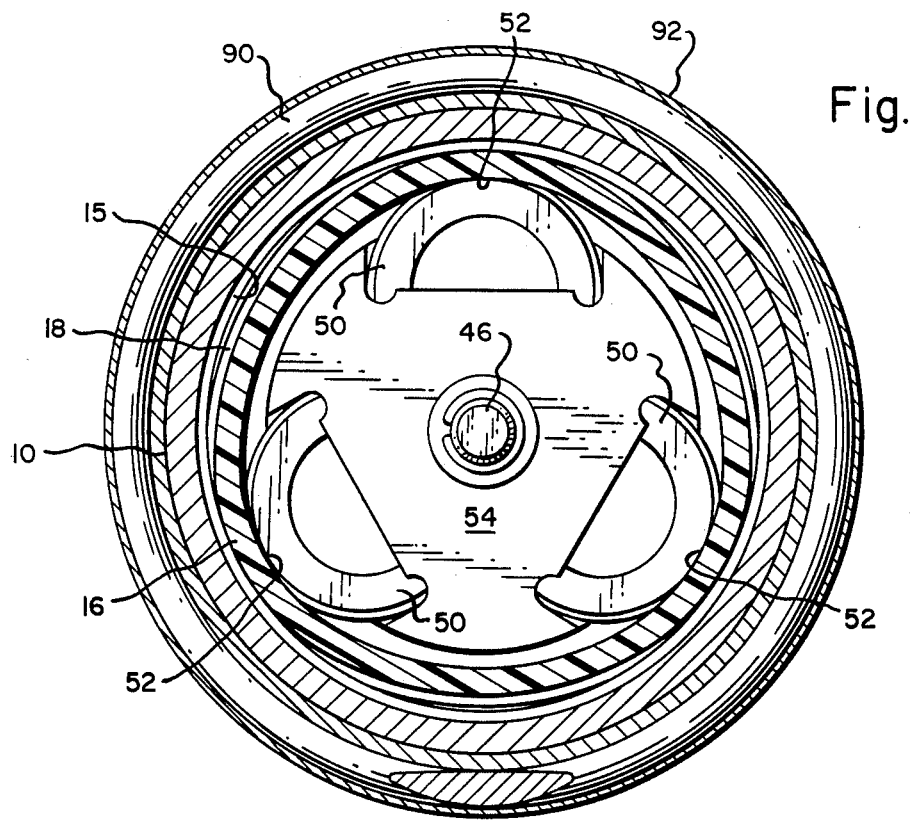
Fig. 7.

HARMONIC SCREW ACTUATOR

BACKGROUND AND OBJECTS OF THE INVENTION

This invention relates to power transmission devices of the rotary-to-linear motion converting type. Such devices are widely used wherever the input power is furnished rotationally such as by an electric motor or the like and where the desired output is in linear directions, and are known as "actuators". However, the present invention has particular application to systems for so-called "climate control" of atmospheres within confined areas, and/or other control functions wherever computer or microprocessor controlling agencies having limited power output capabilities are employed. This invention provides an improved "harmonic screw" type actuator wherein rotary motion of the power input component is converted into linear motion of the output component by means of a strain wave imposed upon a flexible sleeve member of the assembly, which is flexed into intermittent screw engagement by a member which is motor-driven to rotate relative to the periphery of the flexible sleeve; thereby causing progressively advancing/retreating interengagements of thread-like surfaces formed on the axially stationary and axially movable components of the system. Prior art devices of this general type are disclosed for example in U.S. Pat. Nos. 2,906,143; 2,943,508 and 2,979,964, and are employed to operate levers/arms/cranks/slides or the like, such as for opening and closing doors/gates/slides/butterfly damper valves, etc.; and wherever push-pull power outputs are required.

An object of the present invention is to provide for a harmonic screw actuator of the type aforesaid an improved "fail-safe" control arrangement such as will automatically operate devices attached to its power output device. This feature is of particular importance such as for example in the building industry wherein it is required to provide for automatic closing of outside air inlet ducts and simultaneous openings of air outlet ducts, such as in the case of a fire in order to prevent fresh air inlet fannings of the fire and ready escape of smoke from within the building. Another object is to provide a rotary-to-linear actuator as aforesaid which is of high capacity yet of light weight and of simple construction; and which provides for precision positioning with or without feedback. The actuator of the invention eliminates the need for gear reductions such as are normally required in typical screw type actuators; and therefore is of much more simplified and less costly construction.

BRIEF DESCRIPTION OF THE DRAWINGS

FIG. 1 is a longitudinal sectional view through an actuator of the present invention, showing a sectional view of the thread-engaging mechanism in disengaged positions;

FIG. 2 is a fragementary enlarged scale view of the upper right hand portion of FIG. 1;

FIG. 3 corresponds to FIG. 2 but illustrates how transversely disposed thread engagement segments of the screw engaging mechanism appear when the actuator is in operation;

FIG. 4 is an enlarged scale end view taken as along line 4—4 of FIG. 1;

FIG. 5 is a fragmentary side elevational view taken along line 5—5 of FIG. 4;

FIG. 6 is a fragmentary sectional view taken along line 6—6 of FIG. 4;

FIG. 7 is an enlarged scale sectional view taken along line 7—7 of FIG. 1;

DETAILED SPECIFICATION

Figure 8:
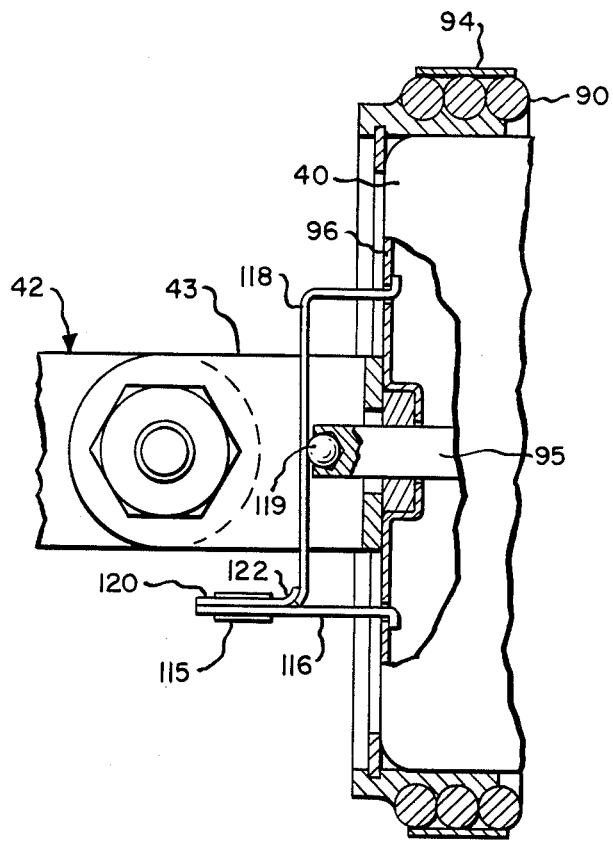
FIG. 8 is a fragmentary enlarged scale view corresponding to the left hand end portion of FIG. 1, but showing an alternative form of environmental heat responsive arrangement for the fail-safe operation of the device.

A preferred version of the present invention is shown at FIGS. 1–3, and typically comprises a structurally rigid outer cylindrical shell member 10 which is closed at one end such as by end plate 12 (which of course may alternatively be formed integrally with the shell). Means for connecting one end of the actuator such as a rod-eye 14 is affixed as shown to the end plate 12. The shell 10 is internally threaded as shown at 15; the thread form being selected on the basis of engineering preference. An elastically deformable cylindrical sleeve portion 16 is externally threaded as shown at 18 and is coupled (as will be explained hereinafter) to extend axially from one end of an inner shell member 20, both of which are freely accommodated within the outer shell member 10. The outside diameter of the sleeve portion 16 when in undeformed state is less than the inside diameter of the shell member 10, whereby when undeformed the sleeve 16 is freely movable axially within the shell 10.

In one preferred form of the invention, the thread 15 in the shell 10 is of the 3-start type and the thread 18 simply comprises a multiplicity of circumferential thread-shaped grooves pitched to match the thread 15. Although the threads 18 on sleeve 16 may be configured to have no lead, other matching thread configurations are employable, and may be either of right hand or left hand type or a combination thereof.

The inner shell 20 comprises a rigid tube made of steel or other material capable of conducting magnetic flux and is fixedly mounted on a collar 22 (FIG. 1) such as by pins shown at 23 to extend axially into the shell 10. At its other end the inner shell 20 abuts the flange 24 of a bushing 26 which is firmly fastened within shell 20 such as by press-fitting thereinto or other suitable means. The end wall portion 28 of collar 22 carries the stator 30 of the actuator drive motor, which may be of either the electric, hydraulic, or pneumatic type. In the preferred version, an electric motor of the permanent magnet stepping type will be employed because of its low synchronous speed characteristic. The rotor of the motor is shown at 31 (FIG. 1). The sleeve 16 includes a reduced diameter end wall thickness axial extension 32, which terminates in an annular shoulder portion 34 into which is fitted a retaining ring 36 which abuts against the end of bushing 26; thereby coupling together the members 16, 20 and 22. An end bell 40 is mounted by means of the pins 23 upon the collar 22 to extend axially therefrom and to provide at its other end means for carrying the opposite end mounting means for said actuator. As shown by way of example, this mounting means may comprise a clevis type connector 42, which is pivotally mounted on a bracket 43 extending from the end bell 40, thereby giving the actuator freedom of operational alignment.

The motor powered drive means preferably comprises a drive shaft 44 which is journaled on a bearing 45 which is carried by the web 28 of the collar 22, and at the far end thereof fixedly carries a roller driver 46 which is grooved as shown at 48 into which rollers 50 are received. The sleeve 16 is similarly grooved as shown at 52 to accommodate the diametrically opposed peripheries of the rollers 50. A free-floating roller retainer 54 is provided to "cage" the rollers in peripherally spaced relation about the driver 46. The driver 46 fixedly carries thereon a thrust bearing 56 against which one end of a telescopic sleeve arrangement 60 bears. As shown, the device 60 comprises a pair of sleeves 62, 64 having interfitting flanges at their coacting ends as shown at 66, and includes a pre-loaded compression spring 68 which bears against coacting flanges 70 of sleeve 62 and flange 72 of sleeve 64. Thus, the spring 68 urges the sleeves to extend into the locked together position as shown in FIG. 3. Whereas the drawing herewith shows use of only one set of three rollers 50, it is to be understood that two or more sets each constituting two or more rollers may be employed in lieu thereof in order to more evenly distribute the load stresses on the operative parts.

A spool 80 carrying the winding 82 of a linear solenoid as indicated generally at 84 is fixedly mounted to and inside of the inner shell 20, and the solenoid armature 85 is disposed in slide fitting relation within the bore of the spool 80. The armature 85 is of cylindrical form to accommodate therethrough the drive shaft 44. End plates 86, 88 of soft iron are fixed to the inner shell 20 at opposite ends of the spool 80 to channel the magnetic flux of the solenoid when energized. The sleeve 64 is fixed to the armature 85.

Thus, it will be understood that when the solenoid winding is energized, the armature 85 moves to the right as shown in FIGS. 1-3 herewith and assumes the positon shown in FIG. 3, thereby moving the roller 50 into more nearly normal attitudes relative to the inner shell end portion 16 compared to when the armature is not energized as shown in FIG. 2. When the rollers are thus urged to stand more nearly normal as shown at FIG. 3, they deform the shell 16 as shown at FIG. 7. Those portions of the shell against which the rollers compress radially expand and drive their associated portions of the thread 18 into engagement with the thread 15 of sleeve 16. In the event that the threads 15 and 18 are not in position to engage, the rollers are thereby prevented from being fully straightened to the position shown in FIG. 3, and as the solenoid advances to closure the spring unit 60 "gives", thereby storing energy into the spring 68. Then, when the actuator motor 30 is energized, drive shaft 44 and driver 46 rotate and cause the rollers to orbit in the manner of a planetary gear system, because of the frictional engagements of the roller rims and the groove 48 in the driver.

Thus, the deformation pattern of sleeve 16 advances along with the rollers 50 until such time as the threads 15 and 18 are in position to engage. At that time, spring 68 is freed to advance the driver and roller assembly into the thread fully engaged positions as shown in FIG. 3. As the motor continues to operate, the advancing sleeve deformation pattern causes the thread engagement points to progress peripherally, whereby the points of thread engagement of thread 18 longitudinally advance relative to thread 15 and as an incident thereto outer shell 10 is displaced axially relative to inner shell 20 in a direction determined by the direction of motor rotation.

In another preferred version of the invention, a variety of fail-safe arrangements may be provided to comprise for example a preloaded tension spring 90 fastened at one end as shown at 92 to the outer shell member 10 and at its other end as shown at 94 to the end bell 40 so as to bias the telescopically related shell 10 and the end bell 40 to maintain a longitudinally abutting relation (FIG. 1), or the spring 90 may be of the compression type so as to bias the parts away from each other. Thus, in the event of disruption of power to the solenoid, whether as a result of power source failure or an intentional control regime, the actuator of the invention will in response to the spring expand (or contract) longitudinally to deliver linearly directed force in the desired direction. Incidental to this, the air confined within the unit between the end plate 12 and the solenoid end plate 88 functions as in a dash pot to dampen the spring force effect, in either direction of operation. Note that as shown in FIG. 3, when the rollers are operating to elastically deform the resilient sleeve 16, they still stand at angles slightly less than normal to the driver 46; whereby the resiliency of the sleeve 16 in combination with the thread camming forces due to the axial forces on the thread system 15 and 18 biases the driver 46 against the force of the solenoid 84. Hence, in the event of loss of power to the solenoid the actuator assumes its disengaged position as shown in FIG. 2, and spring 90 is free to cause the actuator to perform its intended fail-safe function. As shown at 91, a snap-ring held washer is preferably provided at the outer end of the driver 46 to hold the cage 54 against the rollers 50 (when the actuator is disengaged as shown at FIGS. 1 and 2) so as to prevent the rollers from escaping from the groove 52. A similar washer arrangement as shown at 93 is provided to prevent escape of the rollers 50 from groove 48 in driver 46.

Furthermore, provision is made for manually operating the actuator in the event of a power failure such as by extending one end of the drive shaft 44 as shown at 95 through the end wall portion 96 of the end bell 40 to terminate in a knob 97 so that it may be manually push-pulled as well as rotated to either engage or disengage the threads 15, 18 as described hereinabove when electric power is available. In association therewith, a latch device such as shown at 98 (FIGS. 1 and 4-6) is pivotally mounted as shown at 99 upon the end wall 96 of the end bell 40, and is manually operable as by means of a handle 100 to be swung either into or out of interfering enagement with the outer side of a flange 102 carried by the extension 95 of the drive shaft while still permitting the drive shaft to be rotated.

As shown at FIGS. 5 and 6, the latch 98 is cut away as shown at 104 to accommodate the shaft 95 and is counterbored as shown at 106. Thus, in order to manually operate the device such as in the event of a power failure or if other factors call for manual operation, the knob 97 is pushed inwardly to cause the rollers 50 to assume thread engaging position and the latch 98 is thereupon swung into engagement behind flange 102. Thus, the flange 102 is permitted to settle into the latch recess 106 and the latch is therefore locked into holding position. A torsion spring as shown at 108 is mounted on shoulder screw 99 and arranged to bear at its opposite ends on the latch handle 100 and the bracket 43 so as to bias the latch towards its open position. Note that the latch 98 is also cut away as shown at 109 (FIG. 4) so as to engage under the head of a shoulder screw 110 for stabilizing the latch in firmly holding position. Whenever the latch is to be released, the knob 97 is again pressed upon manually, whereupon the flange 102 is displaced axially out of engagement with the latch recess 106 permitting the spring 108 to swing the latch into its open position. Similarly, in the event power is reestablished while the latch 98 is in holding position, the solenoid 84 thereupon operates to pull the armature 85 forwardly enough to release the flange 102 from the latch recess 106 and to permit the spring 108 to open the latch.

FIG. 8 illustrates a system for automatic operation of the actuator whenever the temperature of the ambient atmosphere exceeds a certain degree. Thus, upon any attainment of a pre-selected temperature by the ambient atmosphere the actuator will operate in a fail-safe mode for example to close a heat supply system, or to open a coolant supply system. In this case, a heat-fusible plug as shown at 115 is employed to normally maintain a latch plate 116 in position to maintain a holding plate 118 against the end of shaft extension 95. Thus, the resiliency characteristics of the sleeve 16 acting on the roller driver 46 and drive shaft 44 and its extension 95 cannot cause the shaft extension 95 to be shoved outwardly as viewed in FIGS. 1 and 8, thereby preventing operation of the fail-safe mechanism until such time as the preselected ambient temperature occurs. A ball bearing 119 (FIG. 8) is preferably provided at the end of the shaft 95 to permit it to freely rotate in relation to plate 118. Note that plate 116 carries a trigger plate 120, the inner end of which is slightly curled as shown at 122 to cooperate with a similarly curled end portion of plate 118 to hold the assembly together as long as the plug 115 is intact. However, upon melting of the plug 115 the trigger plate 120 is released to cause the entire plate assembly to collapse and permit the fail-safe feature of the actuator to operate. In order to reset the fail-safe feature for subsequent operation a new sub-assembly consisting of plates 116 and 120 joined by another fusible plug 115 may be readily installed without disassembling and/or moving the actuator from its working position.

Figure 9:
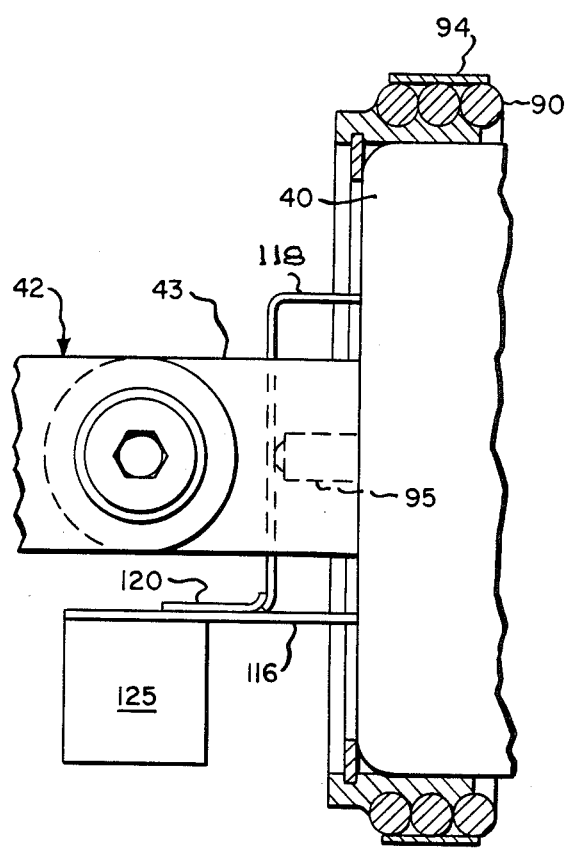
FIG. 9 corresponds to FIG. 8 but illustrates a seismic shock responsive fail-safe operating arrangement therefor.

FIG. 9 illustrates an arrangement for automatically causing the actuator to operate in response to a seismic shock. A holding plate assembly as shown in FIG. 8 may be similarly employed in this case except that the trigger plate 120 is caused to release the assembly by means of a hanging weight such as shown at 125. Thus, the inertia of the weight 125 will respond to a seismic shock to release the fail-safe feature of the actuator by freeing the plate 118.

Figure 10:
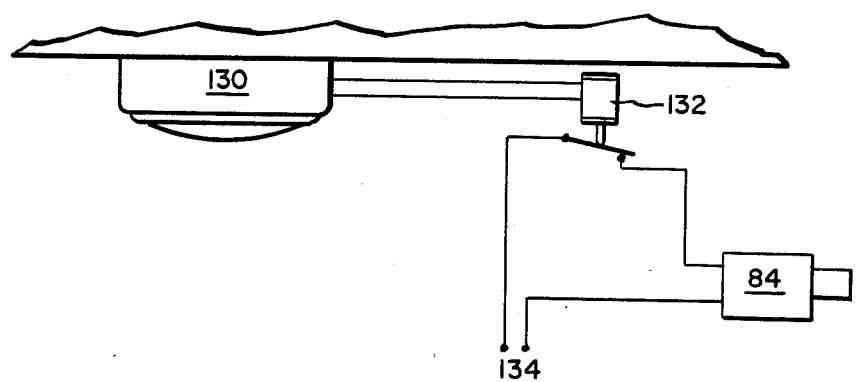
FIG. 10 is a schematic view illustrating an environmental atmosphere smoke detector arrangement for control of the fail-safe operating feature of the invention.

FIG. 10 illustrates incorporation of the actuator of the invention in conjunction with a smoke detector device which is illustrated generally at 130. As shown, a signal from the detector is led to a relay 132 controlling flow of current from source 134 to the solenoid 84 of the actuator. Thus, only a minimum current flow from the detector sufficient to operate the relay 132 will cause the actuator to be energized to come to the aid of the building occupants; such as for example by opening an air exhaust duct and/or closing a fresh air inlet duct, such as would otherwise cause fanning of the source of the smoke.

It will be understood that this device may be converted to a non-releasable type actuator which will "fail in position" upon loss of power, by simply substituting for the plug 115 (FIG. 8) a bolt or rivet or the like. This would keep the roller system in permanent engagement, and would obviate the need for fail-safe spring 90. Nor, in this case (as well as in the arrangements of FIGS. 8 and 9) would the solenoid 84 be employed.

Whereas the invention as illustrated and described hereinabove employs a drive shaft "combination" of members 44, 46; such a combination is preferable only whenever a solenoid as shown at 84 is included as an essential component of the actuator assembly. In this case, the major shaft portion 44 can be made of soft non-magnetic material, and the driver portion 46 is preferably made of hardened long-wearing material. However, the invention may be embodied in an actuator employing no such solenoid, but in lieu thereof locking control means such as shown in FIGS. 4, 7 and 9 herewith. In such case, the actuator "drive shaft" may be made as a single piece of hardenable material.

I claim:

1. A harmonic screw actuator comprising in combination a pair of inner and outer members coaxially mounted for relative axial movement, the outer member having an internal thread portion and the inner member having external thread portion, the outer diameter of the inner member being less than the inner diameter of the outer member, the external thread portion of the inner member being resiliently deformable radially outwardly into contact with the internal thread portion of the outer member; a plurality of rollers arranged inwardly of the inner member in engagement with peripherally separate portions of the external thread portion;

a drive shaft mounted for axial and rotational movement, said rollers being supported for orbital movement in engagement with the peripherally separate portions of the external thread portion incident to rotation of the drive shaft and for outwardly and inwardly directed radial movement to engage and disengage, respectively, the peripherally separate portions of the external thread portion with the internal thread portion of the outer member incident to axially extending movement of the drive shaft relative to the inner member, whereby when the drive shaft is extended axially of the inner member and rotated, the peripherally separate portions of the external thread portion are resiliently deformed into threaded engagement with the internal thread portion and the points of thread engagement advance axially of the internal thread portion to cause the outer member to move axially of the inner member; and means to rotate the drive shaft.

2. The harmonic screw of claim 1, wherein the rollers are pivotally and rotatably mounted on said drive shaft and pivotally and rotatably engaged with the external thread portion of said inner member, the diameters of said rollers being greater than the radial distance between the points of contact which the rollers make with said drive shaft and inner member, whereby axial movement of the drive shaft imparts a radial outward or inward movement to said rollers, thereby engaging or disengaging the external thread portion of said inner member with the internal thread portion of said outer member.

3. The harmonic screw of claim 1, and further comprising a spring means for effecting relative axial movement of said inner and outer members into a fail-safe position defined by said inner and outer members whenever said external thread portion of the inner member is disengaged from the internal thread portion of said outer member.

4. The harmonic screw of claim 1, wherein said means for extending the drive shaft includes a solenoid having an armature coaxially mounted relative to said inner and outer members, and spring means connecting said armature to said drive shaft.

5. A harmonic screw actuator comprising in combination:
   (a) a rigid cylindrically shaped outer shell member (10) closed at one end portion (12) and open at its other end portion, said closed end portion (12) terminating in an external connection device (14), said outer shell member (10) having an internally threaded portion (15);
   (b) a cylindrically shaped inner shell member (20) having an axially extending resiliently deformable end portion (16) having an externally threaded portion (18) and an outer diameter less than the inner diameter of said outer shell member (10), said outer shell member (10) is telescopically disposed about said inner shell member 20 for relative axial movement; said inner shell member (20) being open at one end opposite to the closed end portion (12) of said outer shell member (10) and closed at its other end by an end wall portion (28);
   (c) an end bell (40) extending rigidly from said end wall portion (28) and terminating in an outwardly extending external support connection device (43);
   (d) a motor (30) mounted upon said end wall (28);
   (e) an actuator drive shaft (44, 46) axially slidably and rotatably mounted within bearing means (45) carried by said end wall (28);
   (f) said end portion (16) of said inner shell member (20) being resiliently peripherally deformable and internally trackway grooved (52), and said drive shaft (44, 46) being externally trackway grooved (48);
   (g) a plurality of rollers (50) arranged in peripherally spaced apart relation to trackway roll around in said grooves (48, 52) in accord with rotations of said drive shaft (44, 46) while being canted out of normal attitudes relative to said end portion (16);
   (h) the inner track diameters of said grooved portions (48, 52) and of the outer peripheral diameters of said rollers (50) and of said threaded portion (18) and of said threaded portion (15) being so dimensionally related that, whenever said drive shaft (44, 46) is axially extended relative to said inner shell member (20) so as to cause said rollers (50) to individually extend radially towards normal attitudes relative to said end portion (16), peripherally separate portions of said threaded portion (18) are resiliently deformed into threaded inter-engagement with said threaded portion (15), whereby when said drive shaft (44, 46) is in axially extended position so as to inter-engage said threaded portions (15, 18) and is rotated, the points of thread engagement of thread portion (18) advance axially relative to said thread portion (15) and cause said relative axial movement between said outer shell member (10) and said inner shell member (20);
   (i) means (84, 97) operable to cause said drive shaft (44, 46) to be axially extended; and
   (j) means (30, 97) operable to cause said drive shaft (44, 46) to rotate.

6. An actuator as set forth in claim 5 wherein said end wall portion (28) is flexible to permit said motor (30, 31) to readily adjust to alignment variations of said drive shaft (44, 46) relative to said end portion (16).

7. An actuator as set forth in claim 5 wherein said rollers (50) are housed within cage means (54) operating to maintain said rollers in uniformly peripherally spaced apart relation.

8. An actuator as set forth in claim 7 wherein said drive shaft (44, 46) includes radially projecting shoulder means (91, 93) limiting axial translation of said cage (54) and said rollers (50) relative to said drive shaft (44, 46) so as to prevent displacements of said rollers (50) from said grooves (48, 52).

9. An actuator as set forth in claim 5 wherein spring means (90) is provided to return said actuator to its starting position upon disengagement of said threaded portions (15, 18).

10. An actuator as set forth in claim 9 wherein said spring means (90) compactly encompasses said outer shell (10).

11. An actuator as set forth in claim 5 wherein locking control means (84, 98, 118) are provided to be operable to maintain said shaft (44, 46) and rollers (50) and threaded portions (15, 18) in threaded inter-engaged condition.

12. An actuator as set forth in claim 11 wherein the resiliency of said end portion (16) operates to return said drive shaft (44, 46) to non-extended position upon release of said locking control means (84, 98, 118).

13. An actuator as set forth in claim 11 wherein said locking control means (98) is manually controllable.

14. An actuator as set forth in claim 11 wherein said locking control means (118) is operable in response to a change in temperature.

15. An actuator as set forth in claim 11 wherein said locking control means (118) is operable in response to a mechanical shock imposed on said actuator.

16. An actuator as set forth in claim 11 wherein said locking control means (84) is an electrically energized solenoid and is automatically released upon deenergization thereof.

17. An actuator as set forth in claim 16 wherein the major portion of said valve shaft (44) is formed of non-magnetic material and terminates in a driver portion (46) in which said grooves (48) are provided, and which is formed of long-wearing hardened steel.

18. An actuator as set forth in claim 16 wherein said locking control means (84) is controlled by smoke detector means (130).

19. An actuator as set forth in claim 16 wherein said locking control means (84) includes an axially slidable armature (85) arranged to bias said drive shaft (44, 46) to extend axially.

20. An actuator as set forth in claim 19 including a manually adjustable latching device (98) which is automatically unlatched whenever said solenoid (84) operates to cause said drive shaft (44, 46) to shift axially.

21. An actuator as set forth in claim 19 wherein said solenoid armature (85) is arranged to axially thrust against a bearing device (56) carried by said drive shaft (44, 46) for axial displacements thereof.

22. An actuator as set forth in claim 21 wherein said solenoid (84) operates through means in the form of an axially resilient interconnection device (60).

* * * * *

UNITED STATES PATENT AND TRADEMARK OFFICE
CERTIFICATE OF CORRECTION

PATENT NO. : 4,557,153

DATED : December 10, 1985

INVENTOR(S) : Otmar M. Ulbing

It is certified that error appears in the above-identified patent and that said Letters Patent are hereby corrected as shown below:

Col. 3, line 44 - "roller" should be --rollers--.

Col. 6, line 21 - "7" should be --8--.

Col. 8, line 14 - "translation" should be --translations--.

Col. 8, line 46 - "valve" should be --drive--.

Signed and Sealed this

First Day of April 1986

[SEAL]

Attest:

DONALD J. QUIGG

Attesting Officer

Commissioner of Patents and Trademarks